United States Patent [19]

Yamanaka

[11] 4,306,938
[45] Dec. 22, 1981

[54] REACTOR CORE ELEMENT WITH PAD

[75] Inventor: Tsuneyasu Yamanaka, Hitachi, Japan

[73] Assignee: Hitachi, Ltd., Tokyo, Japan

[21] Appl. No.: 9,285

[22] Filed: Feb. 2, 1979

[30] Foreign Application Priority Data

Feb. 3, 1978 [JP] Japan .................. 53-10496

[51] Int. Cl.³ .............................. G21C 3/08
[52] U.S. Cl. ................................... 376/448
[58] Field of Search ............ 176/76, 78, 81, 90, 176/901 R

[56] References Cited

U.S. PATENT DOCUMENTS

| 3,274,069 | 9/1966 | Alfille | 176/81 |
| 3,309,283 | 3/1967 | Alfille | 176/81 |
| 3,936,349 | 2/1976 | Prescott | 176/81 |
| 4,142,934 | 3/1979 | Wild | 176/78 |

FOREIGN PATENT DOCUMENTS 51-35677 10/1976 Japan .
52-6439 2/1977 Japan .

Primary Examiner—Donald P. Walsh
Attorney, Agent, or Firm—Craig and Antonelli

[57] ABSTRACT

A pad of a fuel assembly with a wrapper tube is pressed out from the interior of the wrapper tube to provide a band-like pad. The pad is reinforced by a reinforcing member fitted in a hollow portion of the pad. The pad is joint to the reinforcing member, or made so that swelling of the pad does not exceed that of the reinforcing material.

9 Claims, 7 Drawing Figures

REACTOR CORE ELEMENT WITH PAD

BACKGROUND OF THE INVENTION

This invention relates to a core element used for a fast breeder reactor, particularly to improvements on a pad construction of the core element.

A pad of a core element for a fast nuclear reactor will be explained hereinafter, taking an example of a nuclear fuel assembly.

Generally, the fuel assembly comprises a handling head of its upper portion, an entrance nozzle of its lower portion having orifices for coolant, and a wrapper tube of a right hexagonal tube protecting interior fuel pins and joining the handling head and the entrance nozzle. A reactor core is constructed by a plurality of the fuel assemblies arranged in honeycomb form with intervals of about 5 mm spaced therebetween. The fuel assemblies arranged in the honeycomb form each are provided with a pad so that the wrapper tubes of the fuel assemblies are spaced by the pads not to directly contact each other. Many pads used for conventional experimental nuclear reactor are formed by pressing out parts of the wrapper tube in round shape from its interior, that is, on each of six faces of the wrapper tube, a flat projection with a round periphery is formed.

On the other hand, it is known that the fuel assembly is bent by neutron beam gradient or temperature gradient, and interfere with other fuel assemblies at the pad portions of the fuel assembly. As nuclear reactors become large-scale, and have higher performance, load due to the interference increases, so that creep deformation of the pad and the wrapper tube will influence the interior fuel pins. Therefore, in order to keep the creep deformation small, various kinds of reinforced pads are proposed. For example in Japanese Pat. Publication No. 35677/1976, a cylindrical spacer pad (11) is disclosed. The spacer pad (11) is rigidly mounted on a hexagonal tube 1 by shrink fit. Practically, however, it seems to be difficult to rigidly mount the spacer pad (11) on the hexagonal tube (1) because tolerance of the tube 1, which is usually made by drawing, is relatively large. Further, the spacer pad 11 has a danger that the spacer pad (11) may fall off from the hexagonal tube 1 because axial ends of the spacer pad (11) of the hexagonal tube (1) may contact with other spacer pad (11) of other hexagonal tubes 1 when the hexagonal tube (1) is inserted in or removed from a core, and because deformation of the hexagonal tube (1) and the spacer pad (11), which deformation is caused by swelling of materials of the hexagonal tube (1) and the spacer pad (11) due to neutron radiation, may convert the rigid insertion of the hexagonal tube (1) to loose insertion. Another pad wherein a band is wound on a wrapper tube and fixed to the wrapper tube by welding, is known, for example in Japanese Pat. Publication No. 6439/1977. When welded, the pad is necessary to be formed to contact the wrapper tube. However, it is difficult to manufacture precisely the wrapper tube so that it will be necessary to reduce the pad or the wrapper tube to fit each other every fuel assembly, therefore much labor is required. Further, if heat supplied for welding is insufficient in order to decrease deformation of the wrapper tube due to the welding, strength of portions welded is insufficient, so that there is a danger that the pad may falls off from the wrapper tube. Even if the pad is welded sufficiently strongly, the welded pad has a danger that smooth insertion of the wrapper tube is prevented by the welded pad. Further welding accompanies a sufficient quality control and inspection, which results in increase of labor.

Accordingly, improved pad construction of core elements such as nuclear fuel assemblies, control rod assemblies and reflectors are desired.

SUMMARY OF THE INVENTION

An object of the invention is to provide a nuclear core element having a pad which is strong enough to bear load due to deformation or swelling and does not fall off from a wrapper tube.

Another object of the invention is to provide a nuclear core element having a pad which is sufficiently strong, and does not prevent smooth insertion of a core element when the core element is exchanged.

Further another object of the invention is to provide a nuclear core element having a pad which is sufficiently strong, labor-saving in its manufacture, and does not prevent smooth insertion of the nuclear core element.

Briefly stated, a feature of the invention is that a pad of a nuclear core element such as a nuclear fuel assembly is pressed out from the interior of the core element to form a band-like projection on the core element face, and a band-like reinforced member is fitted in a hollow made by the projection.

Other features and advantages of the invention will be clear from the following description of preferred embodiments accompanying the drawing.

DESCRIPTION OF THE PREFERRED EMBODIMENTS

Figure 1:
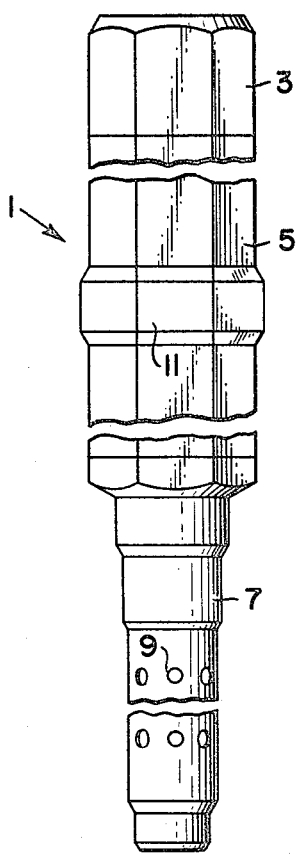
FIG. 1 is a front view of an embodiment of a fuel assembly according to the invention.
Figure 2:
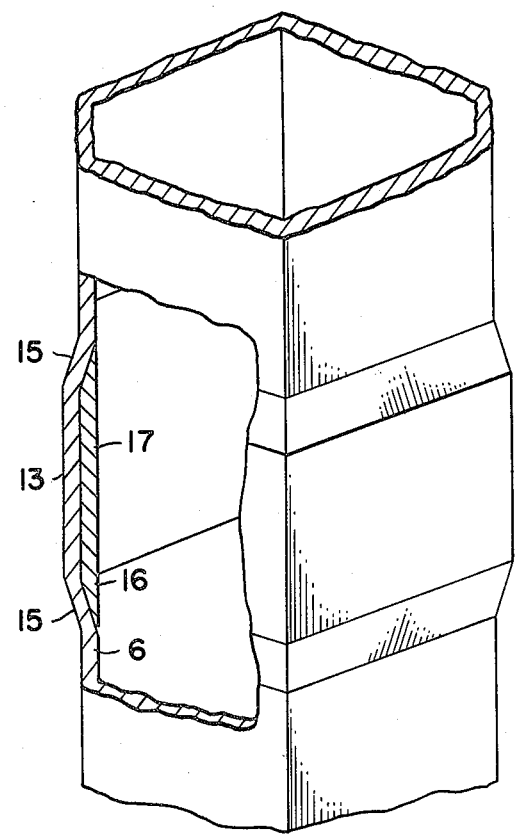
FIG. 2 is an enlarged sectional view of part of the fuel assembly shown in FIG. 1.

Referring to FIGS. 1 and 2, an embodiment of a fuel assembly according to the invention will be described hereinafter in detail.

In FIG. 1, a fuel assembly comprises a handling head 3, a wrapper tube 5 secured to the handling head 3 and containing therein a plurality of fuel rods (not shown), and an entrance nozzle 7 secured to the wrapper tube 5. The entrance nozzle 7 is provided with a plurality of orifices through which coolant flows in the wrapper tube 5. The wrapper tube 5 has a hexagonal shape and a pad 11 which is constructed as shown in FIG. 2. Namely, the pad 11 comprises an axially flat portion 13 pressed out to be projected into the outside of the wrapper tube 5 by about 2 mm, and a gradient portions 15 at both ends of the flat portion 13. A reinforcement 17 made of a plate is fitted in the hollow inside the pad 11 pressed out. The pad 11 of the wrapper tube 5 has a bandlike shape wound closely about the hexagonal wrapper tube 5. The reinforcement 17 also has a band-like shape smilar to the pad 11 of the wrapper tube 5. It is preferable that both ends of the reinforcement 17 with respect to the axis are tapered to present a nearly flat inner face.

Figure 3:
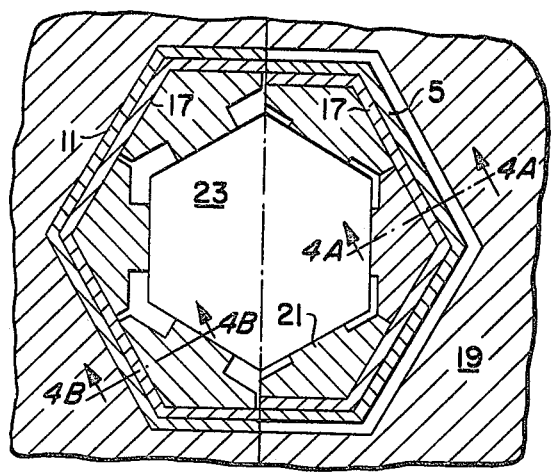
FIG. 3 is a sectional view of the fuel assembly shown in FIG. 1 for explanation of a manufacturing method.
Figure 4A:
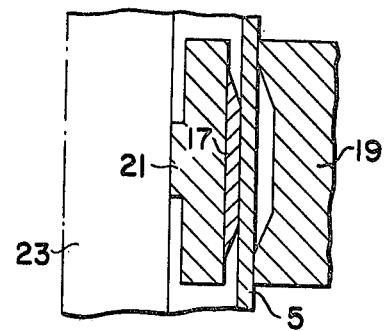
FIG. 4a is a sectional view of the fuel assembly taken along 4A—4A of FIG. 3.
Figure 4B:
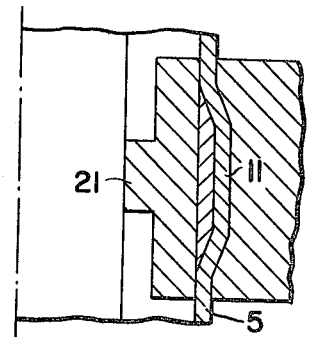
FIG. 4b is a sectional view of the fuel assembly taken along 4B—4B of FIG. 3.

An example of an process of manufacturing the pad 11 is shown in FIGS. 3, 4A and 4B. In FIG. 3, a die 19 is disposed to surround the pad 11 of the wrapper tube 5. Six (6) punches 21 of the same size are disposed in the interior of the wrapper tube 5. The six punches 21 are each connected to a hydraulic power device 23. A relation between the die 19, the wrapper tube 5, the reinforcement 17 and the punches 21 before forming the pad 11 is shown on the right of FIG. 3 and in FIG. 4A. As the hydraulic power device 23 is operated to project the punches 21, the pad 11 and the reinforcement 17 are deformed as shown on the left of FIG. 3 and in FIG. 4B thereby forming the pad 11 to which the reinforcement 17 is fitted.

A plurality of fuel assemblies 1 provided with such pads 11 are inserted in a core, thereby providing an arrangement of the fuel assemblies 1 such that a pad 11 of a fuel assembly 1 contacts with other pads 11 of other fuel assemblies 1.

The pad 11 is strong because the pad 11 of the wrapper tube 5 is pressed out over the whole periphery, and the reinforcement 17 is provided in the hollow portion made by projection of the pad 11. By the gradient portions 15 of the pad 11 which is provided on both the ends of the flat portion 13, a smooth insertion of the fuel assembly 1 is effected. Further, the inside of the pad 11 is made flat by the reinforcement 17 so that coolant in the wrapper tube 5 is restrained by the pad 11 or the reinforcement 17.

The fuel assembly 1 or other metal material in the core is subjected to neutron radiation. It is known that the metal material subjected to the neutron radiation has swelling (volume expansion) caused thereby. A swelling amount changes according to an amount of the neutron radiation and a radiation temperature. Further, according to compositions of the material used, or cold reduction degree of the material, the swelling amount changes largely. There may occur such a danger that the reinforcement 17 falls off from the pad 11 if the swelling of the pad of the wrapper tube 5 becomes larger than that of the reinforcement 17. Therefore, it is necessary to chose proper compositions and cold reduction degree of the the wrapper tube 5 and the reinforcement 17, considering the neutron radiation and the radiation temperature. For example, in a material comprising nickel as a main composition, the swelling decreases largely under the same other conditions, as content of the nickel increases. The similar phenomenon occurs with respect to chrome in a material comprising the chrome as a main composition, even if an influence on swelling by the phenomenon differs. By increasing the content of silicon, niobium, titanium or zirconium, which is added to core element material by a very little, the swelling can be decreased largely. As for carbon, tantalum, molybdenum or phosphorus, which also is added to the core element material by a very little, there is the same tendency as above except for difference of the swelling caused. The swelling can be decreased by increasing degree of cold reduction of the core element material.

For example, as for material, it is preferable that PE-16 containing nickel of about 42 weight percent and SUS 316 containing nickel of about 16 weight percent are used as materials of the wrapper tube 5 and material of the reinforcement 17, respectively; SUS 316 containing silicon of about 1 weight percent for the wrapper tube 5 and SUS 316 containing silicon less than 0.5 percent (in weight) for the reinforcement 17 are used. As for cold reduction of material for the core element, for example, SUS 316 material subjected to cold reduction of 20 percent is used for the wrapper tube 5, and SUS 316 material annealed is used for the reinforcement 17. By constructing thus, the swelling of the pad 11 is less than that of the reinforcement 17 so that the reinforcement can not fall off from the wrapper tube 5.

Figure 5:
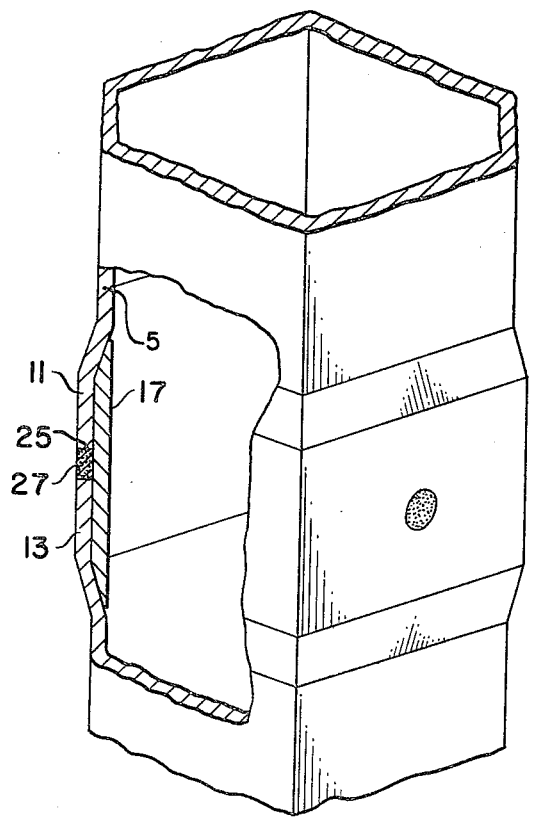
FIG. 5 is a sectional view showing modification of a fuel assembly shown in FIG. 2.
Figure 6:
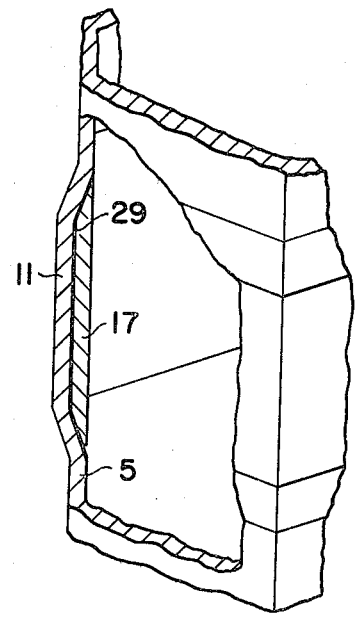
FIG. 6 is a sectional view showing another modification of a fuel assembly in FIG. 2.

Falling of the reinforcement 17 due to the swelling of the wrapper tube 5 and the reinforcement 17 is avoided by another pad construction shown in FIG. 5. In FIG. 5, the flat portion 13 of the wrapper tube pad 11 is provided with holes 25 through which welding is effected. The welding (so-called plug welding) provides deposits 27 by which the reinforcement 17 is fixed to the wrapper tube 5 and does not fall out from the wrapper tube 5 irrespective of occurence of the swelling. FIG. 6 shows another pad construction of the wrapper tube 5 for avoiding falling of the reinforcement 17 from the wrapper tube 5. The pad construction is the same as that of FIG. 2 except for welding. The welding 29 is provided all over the contacting face between the wrapper tube 5 and the reinforcement 17. The welding is effected for example by explosive welding.

As above-mentioned, according to the invention, a strong, labor-saving pad is provided. The pad is constructed so as not to fall off from the wrapper tube, so that accidents of nuclear reactors will be prevented. Further, inserting operation of fuel assemblies is improved.

The invention is explained by taking an example of fuel assembly, but the invention can be used for control rod assemblies or reflectors.

I claim:

1. A core element having a hexagonal tube extending in an axial direction and arranged in adjacent relation to another core element, the improvement comprising a pad having a pad portion which is a pressed out part of the hexagonal tube, the pad portion including six flat side faces forming a hexagonal continuous band-like configuration with gradient portions at the axial ends of the side faces, and a band member fitted in a hollow made in the hexagonal tube opposite to the pad portion pressed out for reinforcing the pad portion.

2. A core element having a wrapper tube extending in an axial direction and arranged in adjacent relation to another core element, the improvement comprising a portion of the wrapper tube pressed out to provide a pad on the periphery of the wrapper tube, the pad having a hexagonal shape forming a continuous band about the periphery of the wrapper tube and being provided with gradient portions at the axial ends of the pad, and a reinforcing band plate fitted in a band-like hollow portion formed in the interior of the pad.

3. A core element as defined in claim 2, wherein the wrapper tube is joined to the reinforcing band plate.

4. A core element as defined in claim 2, wherein the pad presents smaller swelling than the reinforcing band plate when the core element is subjected to neutron radiation.

5. A core element as defined in claim 3, wherein the pad and the reinforcing band plate has at least a plug welding portion at a flat portion of the pad.

6. A core element as defined in claim 3, wherein a welding portion is provided on all contacting faces between the pad and the reinforcing band plate.

7. A core element as defined in claim 4, wherein nickel content of the wrapper tube is more than that of the reinforcing band plate.

8. A core element as defined in claim 4, wherein cold reduction of the wrapper tube is larger than that of the reinforcing band plate.

9. A core element as defined in claim 8, wherein the cold reduction of the wrapper tube is more than 15% and the cold reduction of the reinforcing band plate is less than 15%.

* * * * *